US011312089B2

United States Patent
Wanner et al.

(10) Patent No.: US 11,312,089 B2
(45) Date of Patent: Apr. 26, 2022

(54) METHOD AND DEVICE FOR PRODUCING A FIBROUS PREFORM

(71) Applicant: Premium Aerotec GmbH, Augsburg (DE)

(72) Inventors: Margarita Wanner, Friedberg (DE); Ralph Maennich, Aichach (DE); Alexander Hemmen, Friesoythe (DE); Julian Kuntz, Augsburg (DE)

(73) Assignee: Premium Aerotec GmbH

( * ) Notice: Subject to any disclaimer, the term of this patent is extended or adjusted under 35 U.S.C. 154(b) by 424 days.

(21) Appl. No.: 16/229,426

(22) Filed: Dec. 21, 2018

(65) Prior Publication Data
US 2019/0202144 A1 Jul. 4, 2019

(30) Foreign Application Priority Data
Dec. 29, 2017 (DE) .......................... 102017223875.5

(51) Int. Cl.
*B29C 70/44* (2006.01)
*B29B 11/16* (2006.01)
(Continued)

(52) U.S. Cl.
CPC .............. *B29C 70/44* (2013.01); *B29B 11/12* (2013.01); *B29B 11/16* (2013.01); *B29C 35/0272* (2013.01); *B29C 43/361* (2013.01); *B29C 43/3642* (2013.01); *B29C 70/446* (2013.01); *B29C 2035/0211* (2013.01); *B29C 2043/3644* (2013.01)

(58) Field of Classification Search
None
See application file for complete search history.

(56) References Cited

U.S. PATENT DOCUMENTS

| 5,648,109 A | 7/1997 | Gutowski et al. |
| 2005/0140064 A1 | 6/2005 | Jorn et al. |

(Continued)

FOREIGN PATENT DOCUMENTS

| DE | 10353070 A1 | 6/2005 |
| DE | 102015010000 A1 | 2/2017 |

(Continued)

OTHER PUBLICATIONS

Chinese Search Report for Application No. 201811633401.5 dated Mar. 17, 2021, 3 pages.

*Primary Examiner* — Monica A Huson
(74) *Attorney, Agent, or Firm* — Lerner, David, Littenberg, Krumholz & Mentlik, LLP

(57) ABSTRACT

A method for producing a fibrous preform includes placing a fibrous mat onto a depositing surface, the depositing surface being formed by a web face of a mold core, a first support surface of a first support installation and a second support surface of a second support installation. The fibrous mat is covered by a film and is pressed in a planar manner onto the depositing surface by generating a vacuum. Bringing to bear the fibrous mat on lateral faces of the mold core that extend transversely to the web face is subsequently performed by moving the support installations and the mold core relative to one another in such a manner that a level differential between the web face of the mold core and the support surfaces of the support installations is enlarged. A device for producing a fibrous preform is furthermore described.

15 Claims, 5 Drawing Sheets

(51) Int. Cl.
*B29C 35/02* (2006.01)
*B29B 11/12* (2006.01)
*B29C 43/36* (2006.01)

(56) References Cited

U.S. PATENT DOCUMENTS

2006/0249883 A1    11/2006   Oguma et al.
2014/0116616 A1    5/2014   Kline et al.
2018/0126604 A1    5/2018   Tokutomi

FOREIGN PATENT DOCUMENTS

| EP | 2047972 A1 | 4/2009 |
| EP | 2821201 A1 | 1/2015 |
| EP | 2954994 A1 | 12/2015 |
| JP | 2007253441 A | 10/2007 |
| JP | 2010115867 A | 5/2010 |
| WO | 2017022667 A1 | 2/2017 |

METHOD AND DEVICE FOR PRODUCING A FIBROUS PREFORM

FIELD OF THE INVENTION

The present invention relates to a method and to a device for producing a fibrous preform.

BACKGROUND OF THE INVENTION

Structural components for a fuselage of an aircraft, such as frames and stringers, are increasingly produced from fibre-composite materials. Structural components of this type are usually produced from pre-shaped fibrous preforms which are formed from a multiplicity of fibrous tiers which are provisionally connected to one another. In order for the structural component to be produced, the pre-shaped fibrous preform is then infiltrated by a matrix material. The fibrous preforms can also already be pre-impregnated with a matrix material, thus be present as so-called prepregs, wherein the matrix material is cured in order for the structural component to be produced.

The fibrous preforms are usually produced by bringing to bear a plurality of fibre tiers on a mould core. For example, US 2009/0261199 A1 describes a method for producing a fibre preform, in which a multiplicity of fibrous tiers are deposited on a by a mould core, wherein a lateral peripheral region of the fibrous tiers projects beyond a periphery of the mould core and bears on a depositing plate that is disposed laterally of the mould core. The fibrous tiers, the mould core, and the depositing plate are covered in an air-tight manner by a film. In order for the fibrous tiers to be brought to bear on a lateral surface of the mould core, the contact plate is removed from under the fibrous tiers and a vacuum is generated below the film, on account of which the latter presses the fibrous tiers onto the mould core.

BRIEF SUMMARY OF THE INVENTION

It is an object of the present invention to provide a method and a device by way of which a high-quality fibrous preform is producible in an efficient manner.

According to a first aspect of the invention a method for producing a fibrous preform is provided. According to said method, placing a fibrous mat onto a depositing surface is first performed, said depositing surface being formed by a web face of a mould core, a first support surface of a first support installation and a second support surface of a second support installation, wherein the first support surface and the second support surface adjoin in each case laterally the web face of the mould core. The fibrous mat which has one or a plurality of tiers of a fibrous material and which extends in a planar manner is in this step placed onto a depositing surface which is formed by the mould core as well as support installations which can also be referred to as draping blades or depositing tables. Of course, a plurality of fibrous mats can also be deposited onto the support surface.

The mould core has a first surface, the aforementioned web face, which extends in a transverse direction and a longitudinal direction. The mould core furthermore has a first lateral face that extends transversely to the web face and a second lateral face which extends transversely to the web face, wherein the first lateral face and the second lateral face of the mould core are oriented so as to face away from one another and conjointly with the web face form at least in part an external surface of the mould core. That part of the external surface of the mould core that is formed by the web face and the lateral faces herein corresponds to the shaping of the fibrous preform to be produced.

The support installations have in each case one support surface which can in particular be configured so as to be flat or curved. The support installations for forming the depositing surface or depositing face are disposed so as to be in each case laterally beside the mould core in relation to the transverse direction. The mould core in relation to the transverse direction lies between the support installations, wherein the support faces and the web face form the depositing surface. The fibrous mat is deposited onto said depositing face, wherein a central region of the fibrous mat is deposited on the web face of the mould core and two peripheral regions of the fibrous mat that lie so as to be mutually opposite are deposited on the respective support surfaces. On account of said depositing of the peripheral regions of the fibrous mat on the supporting surfaces, said regions are supported and any non-defined kinking of the peripheral regions is advantageously avoided.

Covering the fibrous mat with an elastically deformable, gas-tight film is performed in a further step of the method. An evacuation-capable operating space between the film and the depositing surface, or generally an operating space that contains the mould core and the support installations as well as the fibrous mat deposited thereon, is formed by means of the film.

Furthermore, the fibrous mat on the depositing surface is pressed in a planar manner onto the depositing surface by generating a vacuum between the film and the depositing surface. The operating space herein is evacuated, or a vacuum is generated, respectively, this leading to the film being attracted to the support installations and to the mould core on which the fibrous mat lies, and the fibrous mat on account thereof pressing in a planar manner onto the depositing surface. The fibrous mat on account thereof is advantageously additionally compacted.

Bringing to bear of the fibrous mat on the lateral faces of the mould core that extend transversely to the web face by moving the support installations and the mould core relative to one another in such a manner that a level differential between the web face of the mould core and the support faces of the support installations is enlarged is subsequently performed. In this step, the support faces under the effect of the negative pressure or vacuum, respectively, are moved along the lateral faces of the mould core away from the web face, which can be implemented by moving the support installations and/or moving the mould core. On account of this relative movement, the peripheral regions of the fibrous mat which are pressed onto lateral faces of the mould core by the film are pulled away from the support surfaces of the support installations. The peripheral regions of the fibrous mat consequently slide along the respective support surface, wherein the film while sliding presses the peripheral regions onto the respective support surface, this leading to a friction force between the support surface and the fibrous mat. This in a reliable manner prevents folds from forming in the fibrous mat as well as an unintentional mutual displacement of the individual fibres or fibrous tiers of the fibrous mat.

According to one embodiment of the method, the first support surface of the first support installation and the second support surface of the second support installation when depositing the fibrous mat continually extend the web face of the mould core. To this end, the support surfaces and the web face can be located in one plane or form such a plane, respectively, for example. In general, an edge of the respective support surface can be located at the same level as an edge of the web face of the mould core that faces the respective edge of the support surface. The level differential between the edges of the web face and the respective edges of the support surfaces when depositing the fibrous mat is thus preferably zero. This offers the advantage that the fibrous mat perse is not deformed when deposited, this further minimizing the risk of folds being formed. Furthermore, automated depositing is facilitated on account thereof.

According to one further embodiment it is provided that the bringing to bear of the fibrous mat on the lateral faces of the mould core comprises a lowering of the first support installation and of the second support installation in relation to the web face of the mould core or a lifting of the mould core in relation to the first support surface and the second support surface. The lifting of the mould core offers the advantage that only one component, specifically the mould core, is movably mounted. The lowering of the support installations however offers the advantage that said support installations can in each case be individually moved, or moved at individual speeds, respectively.

According to one further embodiment the method additionally comprises heating the fibrous mat, on account of which a binding agent contained in the fibrous mat is activated for fixing the fibres of the fibrous mat in that position that said fibres have attained by the bringing to bear of the fibrous mat on the lateral faces of the mould core. A binding agent herein is contained in the fibrous mat, for example in the form of a pulverulent epoxy or thermoplastic material which, for instance, is applied to a lower side of the fibrous mat, said lower side when depositing the fibrous mat is deposited onto the depositing surface. This binding agent is activated by said heating, this leading to curing or melting and solidifying of the binding agent and thus to a setting of the form or shape of the fibrous mat. This advantageously facilitates the further processing of the fibrous preform. In the case of so-called prepregs being used as fibrous mat, thus mats that are pre-impregnated with matrix material, the matrix material is modified in terms of the viscosity thereof by heating, which leads to an adhesive bonding and thus setting of the fibres.

According to one embodiment, the heating for activating the binding agent is performed by generating an electric current flow through electrically conducting fibres of the fibrous mat. An electric current flow herein is generated in electrically conducting fibres, for example carbon fibres, that are contained in the fibrous mat. Since the fibres of the fibrous mat form an electric resistor, said fibres are heated as a result of the electric current flow. Direct heating of the material of the fibrous mat is performed in this way. This offers the advantage that thermal losses are significantly reduced, this reducing both the energy input for heating as well as significantly accelerating said heating. Moreover, a voltage loss can be measured at the electric resistor formed by the fibres. Controlling the temperature of the fibrous mat when heating is simplified in this way, the resistance drops in the case of increasing temperatures (NTC behaviour). The risk of overheating and associated damage to the fibrous mat can be minimized on account thereof, for example.

It is furthermore also conceivable for an electric current flow through the electrically conducting fibres to be generated in regions across a planar extent of the fibrous mat, or for different electric current or output densities to be generated in regions. Even more uniform heating is achieved on account thereof, for example in the case of variable material thicknesses.

According to one embodiment, the electric current flow is generated in that a first contact rail that is disposed on the first support surface and a second contact rail that is disposed on the second contact surface are connected to an electric voltage source. Electrically conducting contact rails, for example copper rails, which are connected to a common voltage source are herein in each case provided in the support faces. The first contact rail forms a positive electric terminal, for example, and the second contact rail forms a negative electric terminal. Electrically conducting fibres, for example carbon fibres, that are contained in the fibrous mat bear on the contact rails and on account thereof connect the latter in an electrically conducting manner.

Clamps or the like which are connected to the fibrous mat can also be utilized for generating a current flow through the fibrous mat.

According to one further embodiment the electric current flow is alternatively or additionally generated in that at least two mould core contact rails that are disposed on the web face and/or the lateral faces of the mould core are connected to an electric voltage source.

Alternatively, heating the fibrous mat by means of thermal radiation, for example infrared radiation, is also conceivable.

According to one further embodiment, after depositing the fibrous mat onto the depositing surface and before placing the film, pressing a first compression plate onto a first peripheral region of the fibrous mat deposited on the depositing surface is performed, wherein the first peripheral region of the fibrous mat is deposited on the first support face, and pressing a second compression plate onto a second periphery region of the fibrous mat deposited on the depositing surface is carried out, wherein the second peripheral region of the fibrous mat is deposited on the second support face, wherein the first compression plate is maintained at a constant spacing from the first support surface, and the second compression plate is maintained at a constant spacing from the second support surface. According to this embodiment, the peripheral regions of the fibrous mat are jammed between the support surface and a respective compression plate or compression strip, or are pressed onto the support surface by the compression plate, respectively. This offers the advantage that a force which acts on the peripheral regions of the fibrous mat when pulling the peripheral regions of the fibrous mat from the support surface can be set even more precisely. The risk of folds forming is further minimized on account thereof.

According to one further aspect of the invention a device for producing a fibrous preform is provided. The device is in particular suitable for carrying out the method described above. The advantages and features disclosed in the context of the method thus apply in analogous manner to the device, and vice versa.

The device has a mould core having a web face, a first lateral face that transversely to the web face extends along a lifting direction, and a second lateral face that transversely to the web face extends along the lifting direction. The first lateral face and the second lateral face of the mould core are oriented so as to face away from one another and conjointly with the web face form an external surface of the mould core. The mould core forms in particular a positive mould for the contour or the cross section, respectively, of the fibrous preform to be produced.

The device furthermore has a first support installation having a first support surface, wherein the first support installation is disposed on a first side of the mould core that is defined by the first lateral face of the mould core. Furthermore, a second support installation having a second support surface is provided, wherein the second support installation is disposed on a second side of the mould core that is defined by the second lateral face of the mould core. The support installations are thus disposed laterally of the mould core, or the mould core is located between the support installations, respectively, wherein the support surfaces of the support installations extend along the mould core, in particular along the web face of the mould core.

The device furthermore has a film installation having a gas-tight, elastically deformable film or membrane for producing an evacuation-capable intermediate space between the mould core, the support installations and the film. The film has a planar extent which is sufficiently large for covering, in particular completely covering, the support surfaces as well as the web surface. Film contact rails can optionally be integrated in the film, said film contact rails being capable of being connected to an electric voltage source so as to generate an electric current flow through electrically conducting fibres of the fibrous mat in order for the fibrous mat to be heated.

An evacuation installation, for example in the form of a suction installation or of a vacuum pump, respectively, is provided in order for the intermediate space to be evacuated. Said evacuation installation is fluidically connected to the intermediate space or is capable of being fluidically connected to the latter. In the event of an evacuation of the intermediate space by means of the evacuation installation, the film is suctioned onto the support surfaces as well as onto the external surface of the mould core.

A lifting installation by means of which the mould core and the support installations are movable relative to one another in the lifting direction is furthermore provided. For example, the mould core by way of said lifting installation can be moved in relation to the support installations; the web face can in particular be lifted or lowered relative to the support faces. Alternatively, the mould core can also be locationally fixed and the support installations can be movable in relation to the mould core by means of the lifting installation; the support surfaces can in particular be lowered or lifted relative to the web face.

A fibrous preform according to the method described above can advantageously be produced by way of the device described. The mobility of the web face and the support surfaces relative to one another offers in particular the advantage that a fibrous mat is capable of being successively brought to bear from the web face onto the lateral faces of the mould core, wherein peripheral regions of the fibrous mat are pulled from the support faces. The risk of folds forming in the fibrous mat is reduced in this way.

According to one embodiment of the device it is provided that the first support installation has a first contact rail that projects beyond the first support surface, and the second support installation has a second contact rail that projects beyond the second support surface, wherein the first contact rail and the second contact rail are capable of being connected to an electric voltage source. The contact rails accordingly form electrically conducting surface regions which are capable of being connected to an electric voltage source. A heating installation of very simple construction is implemented in this way, wherein one of the rails, for example the first contact rail, forms a positive terminal, and the other rail, for example the second contact rail, forms a negative terminal. The contact rails when forming a fibrous mat are electrically connected to one another by electrically conducting fibres of the fibrous mat. The droping voltage on the fibres by virtue of the electrical resistance of the latter serves for heating the fibrous mat. The heating installation thus implemented has a lower energy requirement as compared to usual heating installations such as thermal radiators. Also, heating of the fibrous mat can be implemented in a very short time.

According to one further embodiment the first contact rail extends along a peripheral region of the first support installation that faces the first lateral face of the mould core, and the second contact rail extends along a peripheral region of the second support installation that faces the second lateral face of the mould core.

According to one further embodiment the first contact rail is disposed in a first groove that is configured in the first support surface, and the second contact rail is disposed in a second groove that is configured in the second support surface. The contact rails are accordingly integrated in the support surfaces. Larger conductor cross sections of the contact rails are thus implementable in the case of a predetermined projection beyond the support surface, on account of which the electrical output can be increased.

According to one further embodiment the mould core has a first mould core contact rail and a second mould core contact rail, wherein the mould core contact rails project in each case beyond the web face and/or the lateral faces of the mould core. According to this embodiment mould core contact rails are integrated in the mould core alternatively or in addition to the contact rails provided on the support surfaces.

According to one further embodiment it is provided that the device additionally has a first compression plate and a second compression plate, wherein the first compression plate by means of a first positioning installation is capable of being positioned at a predetermined spacing relative to the first support surface, and wherein the second compression plate by means of a second positioning installation is capable of being positioned at a predetermined spacing relative to the second support surface. The compression plate forms in particular a clamping installation or compression strip by means of which a fibrous preform is capable of being pressed onto the support surface of the respective support installation. The positioning of the respective compression plate on the respective support plate can be performed, for example, by way of one or a plurality of setting screws as the positioning installation, wherein the setting screws couple the compression plate and the respective support installation to one another. A force that acts on the peripheral regions of the fibrous mat is advantageously capable of being set by way of the compression plates.

Electric contact rails for generating a current flow in fibres of the fibrous mat and thus for heating the fibrous mats can also be integrated in the compression plates. To this end, said electric contact rails project beyond a surface of the respective compression plate.

According to one further embodiment it is provided that the film installation has a frame to which the film is fastened in a gas-tight manner. The frame holds in particular a circumferential peripheral region of the film.

According to one further embodiment the device additionally has a pedestal on which the mould core and the support installations are disposed. The pedestal forms in particular an assembly face for the components of the device and can be provided, for example, with corresponding interfaces such as bores, flanges, or similar. Furthermore, the pedestal can also have connector lines, for example electrical lines for supplying the lifting installation or the optional contact rails, or fluid lines for suctioning gas below the film.

It can furthermore be provided that the optional frame of the film installation is capable of being fastened in a gas-tight manner to the pedestal. For example, the frame can be mounted so as to be pivotable on the pedestal, in particular between an operating position or closing position, in which the pedestal and the film installation configure a cavity that is closed in a gas-tight manner, and an opening position in which the film installation releases the mould core and the support installations.

In terms of directional indications and axes, in particular in terms of directional indications and axes which relate to the profile of physical structures, a profile of an axis, of a direction, or of a structure "along" another axis, direction, or structure is herein understood to mean that said axes, directions, or structures, in particular the tangents that result at a respective position of the structures, run in each case at an angle of less than 45 degrees, preferably less than 30 degrees to one another, and in particular preferably parallel with one another.

In terms of directional indications and axes, in particular in terms of directional indications and axes which relate to the profile of physical structures, a profile of an axis, of a direction, or of a structure "transverse" to another axis, direction, or structure, is herein understood to mean that said axes, directions, or structures, in particular the tangents that result at a respective position of the structures, run in each case at an angle of more than or equal to 45 degrees, preferably more than or equal to 60 degrees to one another, and in particular preferably mutually perpendicular.

A "fibrous material" or a "fibre material" herein is generally understood to be a material which is formed from a multiplicity of in particular thread-shaped or thread-piece-shaped reinforcement fibres such as, for example, carbon fibres, glass fibres, ceramic fibres, aramid fibres, boron fibres, mineral fibres, natural fibres, or man-made fibres, or mixtures thereof. The fibrous material can in particular also be impregnated with a resin or matrix material such as, for example, a thermosetting, thermoplastic, elastomeric resin, or generally a synthetic resin or the like.

A "fibrous mat" herein is generally understood to be a component from a fibre material which extends in a planar manner and which is provided for configuring a semi-finished product, a preform, or a component, in particular a component having a circumferential periphery which has a surface having a negligible surface area as compared to a surface area of two main faces of the component that are oriented counter thereto. A fibrous mat can in particular have one or a plurality of layers or tiers of fibre material that lie on top of one another. The individual tiers can in particular be present as a woven fabric or as a cross-laid fabric, in particular in the form of a so-called non-crimp fabric (NCF).

BRIEF DESCRIPTION OF THE DRAWINGS

The invention will be explained hereunder with reference to the figures of the drawings. In the figures.

DETAILED DESCRIPTION

The same reference signs identify identical or functionally equivalent components in the figures, in as far as no reference is made to the contrary.

Figure 1:
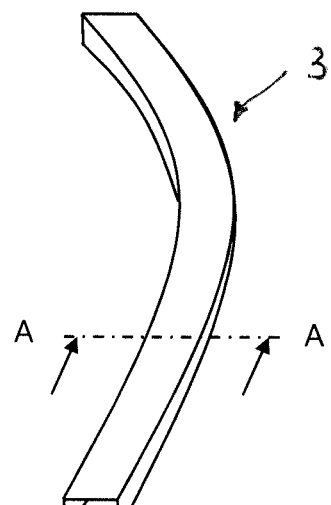
FIG. 1 shows a perspective view of a fibrous preform in a schematic illustration.
Figure 2:
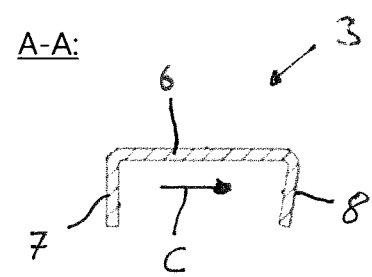
FIG. 2 shows a sectional view of the fibrous preform shown in FIG. 1, said sectional view resulting in a section along the line A-A shown in FIG. 1.

FIG. 1 in an exemplary and schematic manner shows a fibrous preform 3. FIG. 2 shows a schematical sectional view of the fibrous preform 3 shown in an exemplary manner in FIG. 1. The fibrous preform 3 is configured as an elongate component which can in particular have a longitudinal extent running in a curved manner, for example a longitudinal extent running in an arcuate manner, as is shown in FIG. 1. The fibrous preform 3 can in particular be provided as a semi-finished product for producing a structural component of an aircraft, for example for producing a frame.

As is shown in FIG. 2, the fibrous preform 3 has a transverse web 6 as well as a first lateral web 7 and a second lateral web 8. The transverse web 6 configures the curve profile shown in an exemplary manner in FIG. 1, and additionally extends in a transverse direction C. The first lateral web 7 and the second lateral web 8 extend in each case transversely to the transverse web 6 and conjointly with the latter configure an approximately C-shaped or U-shaped cross section of the fibrous preform 3. On the case of the cross section of the fibrous preform 3 shown in an exemplary manner in FIG. 2, the first lateral web 7 extends approximately perpendicularly to the transverse web 6; the second lateral web 8 extends at an angle to the transverse web 6 and configures in particular an undercut.

Figure 5:
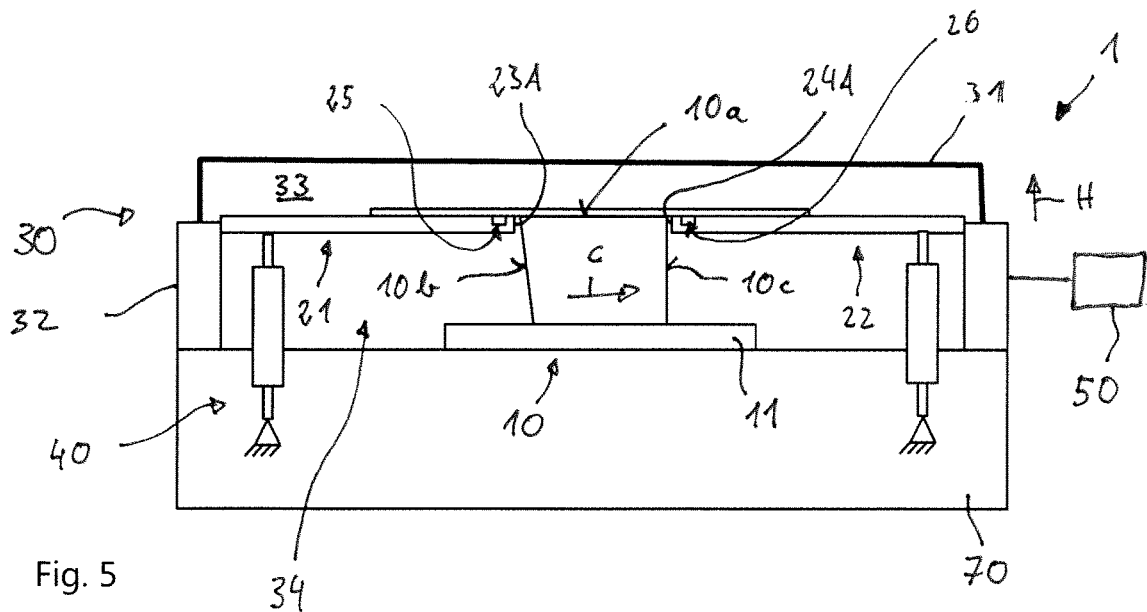
FIG. 5 shows a schematic view of the device while carrying out a further step of a method according to an exemplary embodiment of the present invention.
Figure 6:
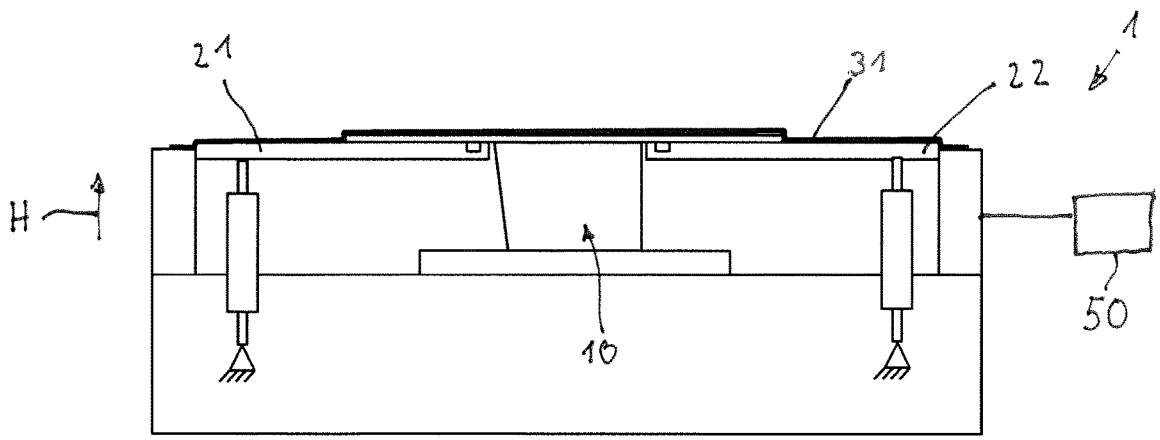
FIG. 6 shows a schematic view of the device while carrying out a further step of a method according to an exemplary embodiment of the present invention.

A device 1 for producing a fibrous preform 3, in particular the fibrous preform 3 shown schematically in FIGS. 1 and 2, is shown in an exemplary manner in FIG. 5. The device 1 has a mould core 10, a first support installation 21, a second support installation 22, a film installation 30, a lifting installation 40, and an evacuation installation 50. As is moreover shown in FIG. 5, an optional pedestal 70 can be additionally provided.

Figure 3:
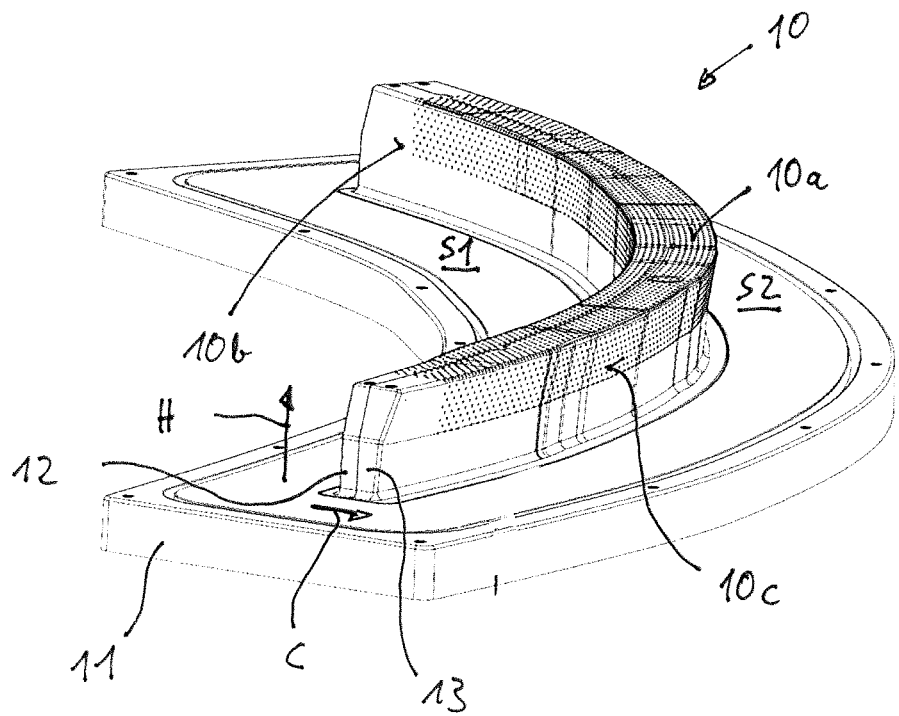
FIG. 3 shows a perspective view of a mould core of a device according to one exemplary embodiment of the present invention.

FIG. 3 in an exemplary manner shows a perspective view of the mould core 10. The mould core 10 is shown in a sectional view in FIG. 5. The mould core 10 forms a positive mould for producing the fibrous preform 3. This means that an external contour of the mould core 10 that is formed by an external surface 10a, 10b, 10c of the mould core 10 establishes the cross-sectional profile of the fibrous preform 3 to be produced. The mould core 10 can in particular be configured as an elongate block which can in particular have a longitudinal extent that runs in a curved manner, for example a longitudinal extent that runs in an arcuate manner, as is shown in an exemplary manner in FIG. 3.

The mould core 10 has a web face 10a, a first lateral face 10b, and a second lateral face 10c. The web face 10a forms the optional curve profile of the longitudinal extent of the mould core 10, and extends additionally in a transverse direction C. The first lateral face 10b along a lifting direction H extends transversely to the web face 10a. The second lateral face 10c extends likewise along the lifting direction H and transversely to the web face 10a. As is shown in particular in FIGS. 3 and 5, the first lateral face 10b and the second lateral face 10c of the mould core are oriented so as to face away from one another.

As is shown in an exemplary manner in FIG. 3, the mould core 10 can be disposed on an optional base plate 11. The mould core 10 herein projects from the base plate 11 and can in particular be releasably connected to the base plate 11, for example by way of a latch-fit (not shown). Furthermore, the mould core 10 in relation to the transverse direction C can be assembled so as to be separable from two part-cores 12, 13, as is schematically shown in FIG. 3. A first part-core 12 herein includes the first lateral face 10b and part of the web face 10a. A second part-core 13 includes the second lateral face 10c and a remaining part of the web face 10a. A mould core 10 assembled from part-cores 12, 13 facilitates a removal of the mould core 10 after the production of the fibrous preform 3.

The mould core 10 can in particular be produced from a plastics material, a metal material, or from timber.

Figure 10:
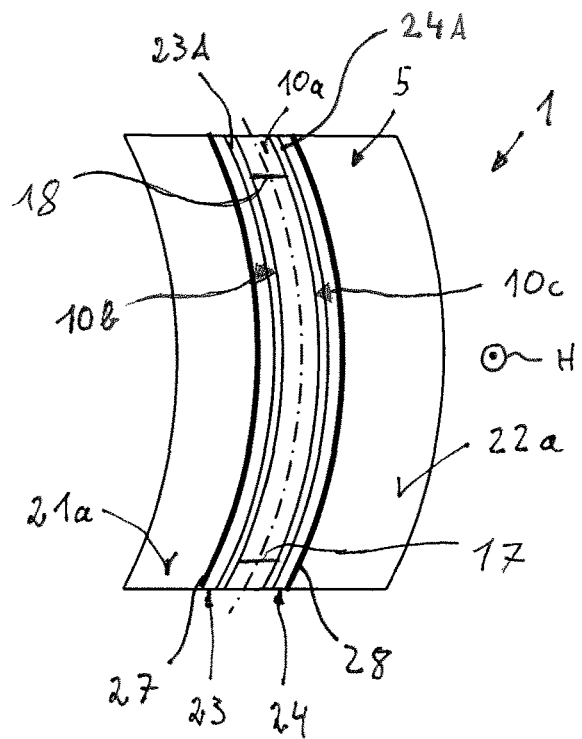
FIG. 10 shows a plan view of a device according to an exemplary embodiment according to the present invention as a schematic illustration.

The support installations 21, 22 are shown in a sectional view in FIG. 5. A plan view of the support installations 21, 22 is illustrated in FIG. 10. The first support installation 21 has a first support face 21a. The second support installation 22 has a second support face 22a. As is shown in an exemplary manner in FIGS. 5 and 10, the first support installation 21 and the second support installation 22 are in each case configured as plate-shaped components that extend in a planar manner. As is shown in FIG. 10, it can in particular be provided that a lateral periphery 23A of the first support installation 21 has a curve profile which corresponds to a curve profile of the first lateral face 10b of the mould core 10. It can furthermore be provided that a lateral periphery 24A of the second support installation 22 has a curve profile which corresponds to a curve profile of the second lateral face 10c of the mould core 10.

As is in particular schematically shown in FIGS. 5 and 10, the first support installation 21 has an optional first contact rail 27, and the second support installation 22 has an optional second contact rail 28. The first contact rail 27 projects beyond the first support surface 21a. The second contact rail 28 projects beyond the second support surface 22a. As is illustrated in an exemplary manner in FIGS. 5 and 10, the first contact rail 27 and the second contact rail 28 can in each case be configured as elongate rails which optionally extend across the entire longitudinal extent of the respective support installation 21, 22.

As is furthermore shown in FIGS. 5 and 10, the first contact rail 27 is optionally disposed in a peripheral region 23 of the first support installation 21 that adjoins the lateral periphery 23A, said first contact rail 27 extending along the lateral periphery 23A. The second contact rail 28 is optionally disposed in a peripheral region 24 of the second support installation 22 that adjoins the lateral periphery 24A, said second contact rail 28 extending along the lateral periphery 24A.

Figure 9:
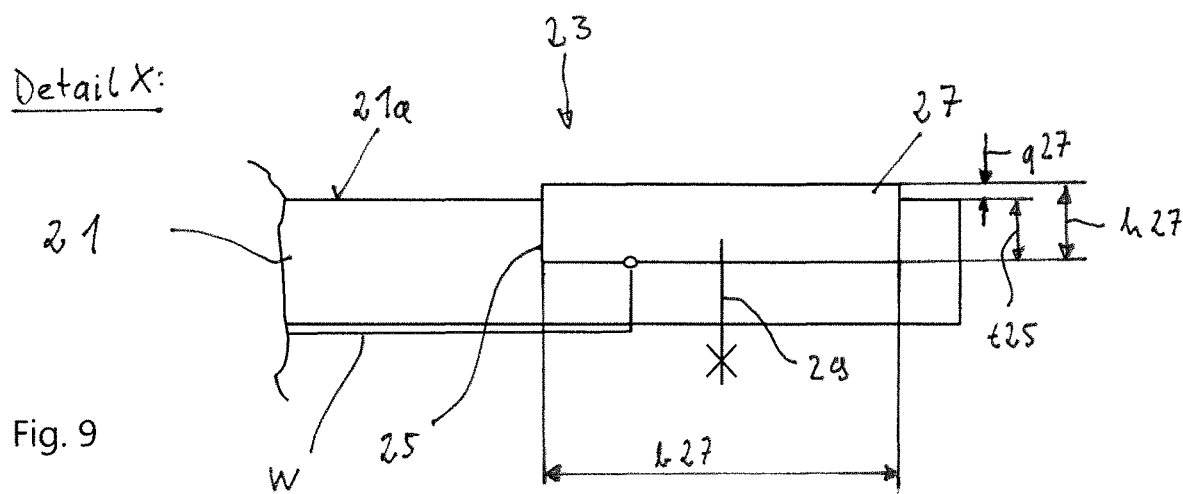
FIG. 9 shows a detailed view of the region identified by the letter X of the device shown in FIG. 8.

FIG. 9 shows in detail a sectional view of the peripheral region 23 of the first support installation 21. As is shown in FIG. 9, the first contact rail 27 can in particular be disposed in a first groove 25 that is configured in the first support surface 21a. As is schematically indicated in FIG. 5, the second contact rail 28 can also be disposed in a second groove 26 that is configured in the second support surface 22a. As can furthermore be seen in FIG. 9, the respective groove 25, 26 as well as the respective contact rail 27, 28 can have a rectangular cross-sectional shape, for example. As is furthermore shown in FIG. 9, the groove 25 has a groove depth t25 which is smaller than a height h27 of the contact rail 27, on account of which a projection q27 beyond the first support face 21a results. In general, a projection of one of the contact rails 27, 28 beyond the respective support face 21a, 22a can be, for example, between 10 percent and 20 percent of the groove depth of the respective groove 25, 26. The height h27 of the contact rail 27 can in particular be in a range between 5 mm and 15 mm and be, for example, 10 mm. A width b27 of the contact rail 27 can in particular be in a range between 7 mm and 22 mm and be, for example, 15 mm. The groove depth t27 lies in particular in a range between 4 mm and 12 mm and can be, for example, 8.5 mm.

The contact rails 27, 28 are fastened to the respective support installation 21, 22. This can in particular be performed by means of fastening installations. As is shown in an exemplary manner in FIG. 9, the contact rails 27, 28 are optionally screwed to the respective support installation 21, 22, wherein a fastening screw 29 is screwed into the respective contact rail 27, 28 from a rear surface 21b, 22b that is located opposite the support face 21a, 22a through the respective support installation 21, 22. The fastening screw 29 is illustrated only in a schematic manner in FIG. 9.

Figure 8:
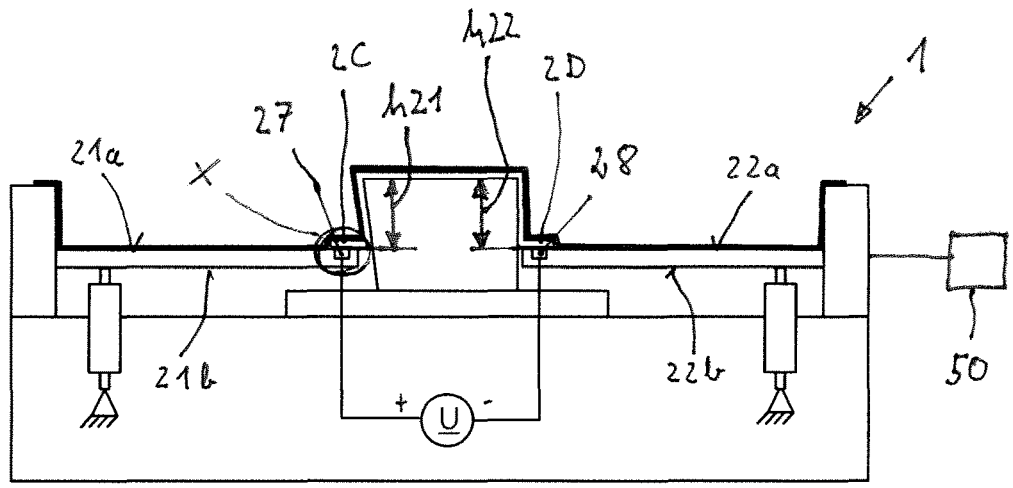
FIG. 8 shows a schematic view of the device while carrying out the step shown in FIG. 7 at a later point in time.

As is schematically illustrated in FIG. 8, the first contact rail 27 and the second contact rail 28 are capable of being connected to an electric voltage source U. This means that the contact rails 27, 28 are in each case capable of being connected to a terminal of a voltage source. In FIG. 8 the first contact rail 27 is connected to a positive terminal of the voltage source U, and the second contact rail 28 is contacted to a negative terminal of the voltage source U, for example. Connector lines W that are installed on the rear side surface 21b, 22b of the respective support installation 21, 22 can be provided for connection to the voltage source U as is schematically illustrated in FIG. 9. Furthermore, a plurality of contact rail sections (not shown) which are disposed behind one another and which are in each case capable of being individually connected to the voltage source U in a mutually independent manner can be provided.

The contact rails 27, 28 are in each case configured from an electrically conductive material such as, for example, copper, aluminium, or the like. The first support installation 21 and the second support installation 22 are in each case formed from an electrically insulating material, in particular a plastics material, a timber material such as, for example, medium-density fibre boards (MDF), or the like.

Figure 12:
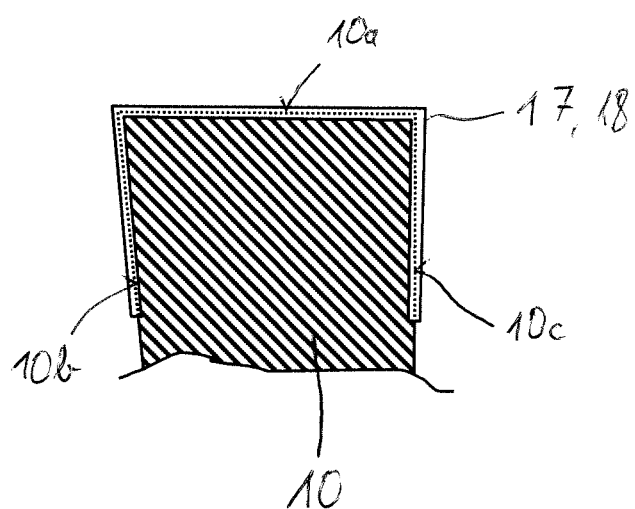
FIG. 12 shows a schematic sectional view of a mould core of a device according to a further exemplary embodiment of the present invention.

As can be seen in FIG. 10 and is shown in detail in FIG. 12, the mould core 10, alternatively or additionally to the contact rails 27, 28, can have mould core contact rails 17, 18. As is shown in FIG. 10, a first mould core contact rail 17 and a second mould core contact rail 18 can be provided, for example. The first mould core contact rail 17 and the second mould core contact rail 18, in particular in relation to the longitudinal extent of the mould core 10, can be disposed so as to be mutually spaced apart as is shown in an exemplary manner in FIG. 10. In general, the mould core contact rails 17, 18 project beyond the web face 10a and/or beyond the lateral faces 10b, 10c of the mould core 10.

FIG. 12 shows a sectional view of the mould core 10 shown in FIG. 10 through the first mould core contact rail 17 or the second mould core contact rail 18. As can be seen in FIG. 12, the mould core contact rails 17, 18 are optionally configured so as to correspond to the cross-sectional profile of the mould core 10. Alternatively thereto, it can also be provided that the first mould core contact rail 17 is integrated in the first lateral face 10b of the mould core 10 and extends along the longitudinal extent of the mould core 10, and the second mould core contact rail 18 is integrated in the second lateral face 10c of the mould core 10 and likewise extends along the longitudinal extent of the mould core 10 (not illustrated).

The mould core contact rails 17, 18 are in each case configured from an electrically conductive material such as, for example, copper, aluminium, or the like. The first support installation 21 and the second support installation 22 are in each case formed from an electrically insulating material, in particular a plastics material, a timber material such as, for example, medium-density fibre boards (MDF), or the like. Furthermore, the mould core contact rails 17, 18 are likewise capable of being connected to the electric voltage source U.

As is illustrated in FIGS. 5 and 10, the first support installation 21 is disposed on a first side S1 of the mould core 10 that is defined by the first lateral face 10b of the mould core 10. The lateral periphery 23A of the first support installation 21 herein faces the first lateral face 10b. The first support surface 21a, like the web face 10a of the mould core 10, is oriented in the lifting direction H. The second support installation 22 is disposed on a second side S2 of the mould core 10 that is defined by the second lateral face 10c of the mould core 10. The lateral periphery 24A of the second support installation 22 herein faces the second lateral face 10c. The second support surface 22a, like the web face 10a of the mould core 10, is oriented in the lifting direction H. As is illustrated in FIGS. 5 and 10, the mould core 10 in relation to the transverse direction C is thus disposed between the support installations 21, 22, or the first support surface 21a and the second support surface 22a in each case laterally adjoin the web face 10a of the mould core 10, respectively.

The lifting installation 40 is configured for moving the mould core 10 and the support installations 21, 22 relative to one another in the lifting direction H and, on account thereof, for setting in each case a level differential h21 between the web face 10a of the mould core 10 and the first support surface 21a of the first support installation 21, and a level differential h22 between the web face 10a of the mould core 10 and the second support surface 22a of the second support installation 22. The lifting installation 40 is optionally also configured for setting a lateral spacing between the support installations 21, 22 and the mould core 10. The mould core 10 in the case of the device 1 illustrated in an exemplary manner in FIGS. 4 to 8 is disposed so as to be locationally fixed, and the support installations 21, 22 are in each case repositionable in the lifting direction H by means of the lifting installation 40. In general, the first support surface 21a along the first lateral face 10b of the mould core 10, and the second support surface 22a along the second lateral face 10c of the mould core 10, are in each case capable of being lowered in relation to the web face 10a of the mould core 10, as is shown by a comparison of FIGS. 6, 7 and 8. Alternatively thereto, the support installations 21, 22 can also in each case be disposed so as to be locationally fixed, and the mould core 10 can be movable by means of the lifting installation 40. In this case, the web face 10a of the mould core 10 is deployable in the lifting direction H in relation to the first support surface 21a and to the second support surface 22a. In general, the lateral peripheries 23A, 24A of the support installations 21, 22, and the lateral faces 10b, 10c of the mould core 10, by means of the lifting installation 40 are movable relative to one another at least in the lifting direction H.

The lifting installation 40 can be formed, for example, by one or a plurality of hydraulic cylinders as is schematically shown in FIGS. 4 to 8. Of course, a lever kinematic system or the like can also be provided as the lifting installation 40.

The mould core 10 and the support installations 21, 22 are disposed on the optional pedestal 70. The lifting installation 40 can likewise be mounted on the pedestal 70. As is illustrated in an exemplary manner in FIG. 5, the base plate 11 on which the mould core 10 is disposed can in particular be disposed on the pedestal 70.

The film installation 30 has a gas-tight, elastically deformable film 31, and optionally a frame 32. The film 31 has a planar extent which is sufficiently large so as to completely cover the support surface 21a, 22a as well as the mould core 10. A circumferential peripheral region 31A of the film 31 is fastened in a gas-tight manner to the optional one frame 32.

An intermediate space 33 between the mould core 10, the support installations 21, 22 and the film 31 is producible by covering the support faces 21a, 22a and the mould core 10 with the film 31. This intermediate space 33 is evacuation-capable by means of the evacuation installation 50, on account of which the film 31 is suctioned onto the support faces 21a, 22a, the web face 10a of the mould core 10, and depending on the position of the support installations 21, 22 onto the lateral faces 10b, 10c of the mould core 10.

If the film installation 30 has an optional frame 32, and if the mould core 10 as well as the support installations 21, 22 are disposed on an optional pedestal 70, as is shown in an exemplary manner in FIGS. 4 to 8, a closed, gas-tight operating space 34 in which the mould core 10 and the support installations 21, 22 are disposed can advantageously be formed by the film installation 30 and the pedestal 70. FIGS. 5 to 8 show the film installation 30 in a closing position in which the frame 32 bears in a gas-tight manner on the pedestal 70 and the film 31 completely covers the mould core 10 and the support installations 21, 22, such that the closed operating space 34 is configured.

The film 31 can in particular be formed from a plastics material, in particular from silicone/rubber mixtures such as, for example, Mosites Rubber®. Reinforcement elements (not shown) in the form of stays or areas from a reinforcing material such as, for example, a fibre-reinforced plastics material, timber, metal, or the like can be disposed or fixed, respectively, in regions on the film 31. Said reinforcement elements prevent any deformation or reduce the deformation capability of the film 31 in these regions.

The evacuation installation 50 in FIGS. 4 to 8 is illustrated only in a schematic manner as a functional block and serves for suctioning gas from the intermediate space 33, or the operating space 34, respectively, wherein the evacuation installation 50 is fluidically connected to the intermediate space 33, or the operating space 34, respectively. The evacuation installation 50 is in particular suitable for configuring a vacuum in the intermediate space 33, or the operating space 34, respectively, and can be configured, for example, as a vacuum pump or the like.

Figure 11:
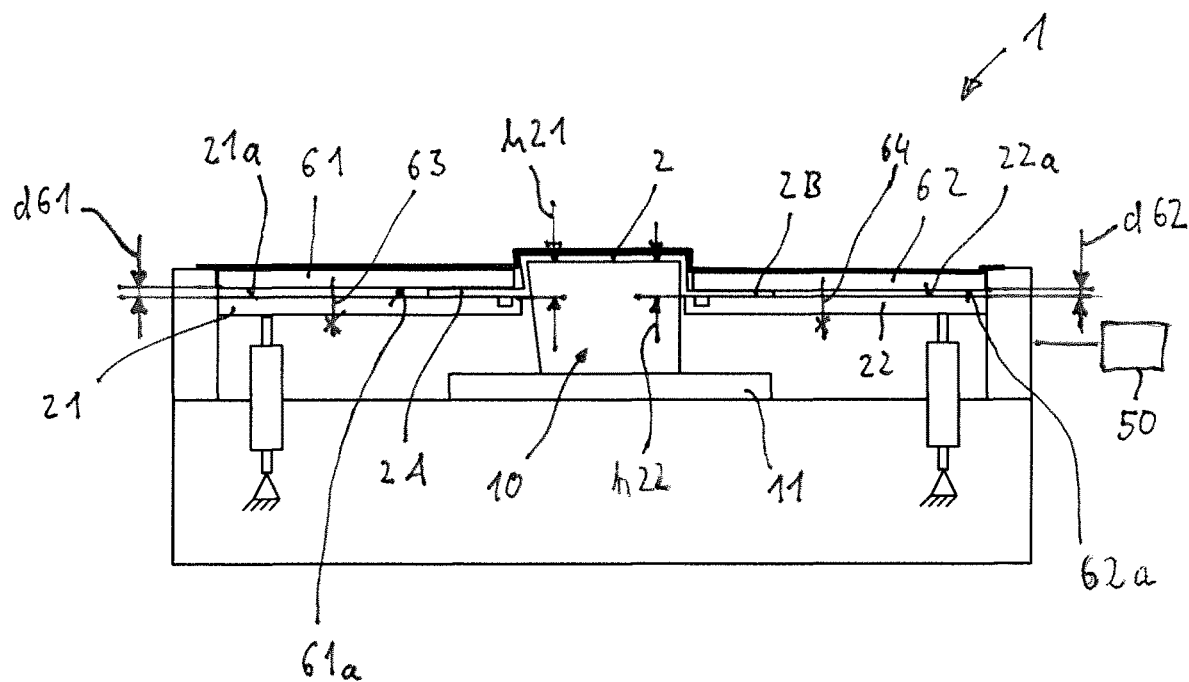
FIG. 11 shows a schematic view of a device according to a further exemplary embodiment of the present invention while carrying out a step of a method according to an exemplary embodiment of the present invention.

The device 1 schematically shown in FIG. 11 additionally has an optional first compression plate 61 and an optional second compression plate 62. The device 1 shown in FIG. 11 is otherwise identical to the device 1 described by means of FIGS. 4 to 8 and of FIG. 10.

The first compression plate 61 and the second compression plate 62 can in each case be configured as plates that extend in a planar manner. The first compression plate 61 optionally has dimensions that are identical to those of the first support installation 21, and the second compression plate 62 has dimensions that are identical to those of the second support installation 22. It is also conceivable that the first compression plate 61 and the second compression plate 62 have in each case a longitudinal extent that is identical to that of the first support installation 21 and the second support installation 22, respectively, but are otherwise embodied so as to have a smaller width. The first compression plate 61 in general has a first bearing face 61a which is provided for bearing on a first peripheral region 2A of the fibrous mat 2. The second compression plate 62 likewise has in general a second bearing face 62a which is provided for bearing on a second peripheral region 2B of the fibrous mat 2. The compression plates 61, 62 thus serve for clamping a peripheral region 2A, 2B of a fibrous mat 2 between the bearing face 61a, 62a and the support face 21a, 22a.

As is illustrated in FIG. 11, the first compression plate 61 by means of a first positioning installation 63 is capable of being positioned at a predetermined spacing d61 relative to the first support surface 21a, wherein the first bearing face 61a faces the first support surface 21a. The second compression plate 62 by means of a second positioning installation 64 is capable of being positioned at a predetermined spacing d62 relative to the second support surface 22a, wherein the second bearing face 62a faces the second support surface 22a. The positioning installations 63, 64 can in particular be implemented as setting screws which couple the first compression plate 61 to the first support installation 21 and the second compression plate 62 to the second support installation 22, as is schematically illustrated in FIG. 11. A predetermined first spacing d61 between the first compression plate 61 and the first support installation 21, in particular between the first bearing face 61a and the first support surface 21a, is capable of being set by means of the first positioning installation 63. A predetermined second spacing d62 between the second compression plate 62 and the second support installation 22, in particular between the second bearing face 62a and the second support surface 22a, is capable of being set by means of the second positioning installation 64.

A method for producing a fibrous preform 3 will be described hereunder. This method can in particular be carried out with the aid of the device 1 described above. Reference hereunder is therefore made to the description above.

Figure 4:
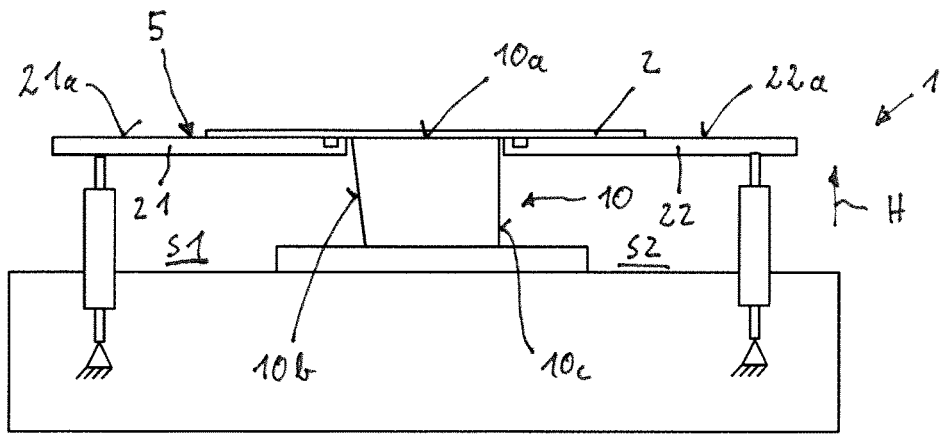
FIG. 4 shows a schematic view of a device according to one exemplary embodiment of the present invention while carrying out a step of a method according to an exemplary embodiment of the present invention.

Placing a fibrous mat 2 onto a depositing surface 5 is performed in a first step of the method, as is shown in an exemplary manner in FIG. 4. The depositing face 5 is formed by the web face 10a of the mould core 10, the first support surface 21a of the first support installation 21, and the second support surface 22a of the second support installation 22, wherein the first support surface 21a and the second support surface 22a in each case laterally adjoin the web face 10a of the mould core 10. The web face 10a of the mould core 10, the first support surface 21a, and the second support surface 22a, when depositing the fibrous mat 2, optionally are located in one plane, or configure one plane, respectively, as is illustrated in an exemplary manner in FIG. 4. The fibrous mat 2 is in particular deposited by way of a first peripheral region 2A onto the first support surface 21a, by way of a second peripheral region 2B that is located opposite the first peripheral region 2A onto the second support surface 22a, and by way of a central region that is located between the first peripheral region 2A and the second peripheral region 2B onto the web face 10a of the mould core 10.

Pressing the first peripheral region 2A of the fibrous mat 2 onto the first support surface 21a by means of the first compression plate 61, and pressing the second peripheral region 2B of the fibrous mat 2 onto the second support surface 22a by means of the second compression plate 62 can optionally be performed after depositing the fibrous mat 2, such as is shown in an exemplary manner in FIG. 11. To this end, the compression plates 61, 62 by means of the positioning installation 63, 64 are positioned by way of the first spacing d61 and the second spacing d62, respectively, relative to the respective support installation 21, 22. The first and the second spacing d61, d62 are in particular set in such a manner that the peripheral regions 2A, 2B of the fibrous mat are clamped between the bearing faces 61a, 62a of the compression plates 61, 62 and the support surfaces 21a, 22a of the support installations 21, 22 by way of a desired clamping force.

Covering the fibrous mat 2 with the film 31 is subsequently performed. As is illustrated in an exemplary manner in FIG. 5, this can be performed, for example, in that the film installation 30 is disposed in the closing position in relation to the pedestal 70 and, on account thereof, the closed operating space 34 is formed about the mould core 10, the support installations 21, 22, and the deposited fibrous mat 2. In the case of the optional pressing of the peripheral regions 2A, 2B of the fibrous mat 2 by means of the compression plates 61, 62, as is shown in FIG. 11, the compression plates 61, 62 as well as the exposed regions of the fibrous mat 2 are covered by the film 31, as is schematically illustrated in FIG. 11.

Furthermore, a vacuum between the film 31 and the depositing surface 5 is generated, for example by evacuating the operating space 34 with the aid of the evacuation installation 50. On account thereof, the fibrous mat 2 is pressed in a planar manner onto the depositing surface 5, as is shown in an exemplary manner in FIG. 6.

Figure 7:
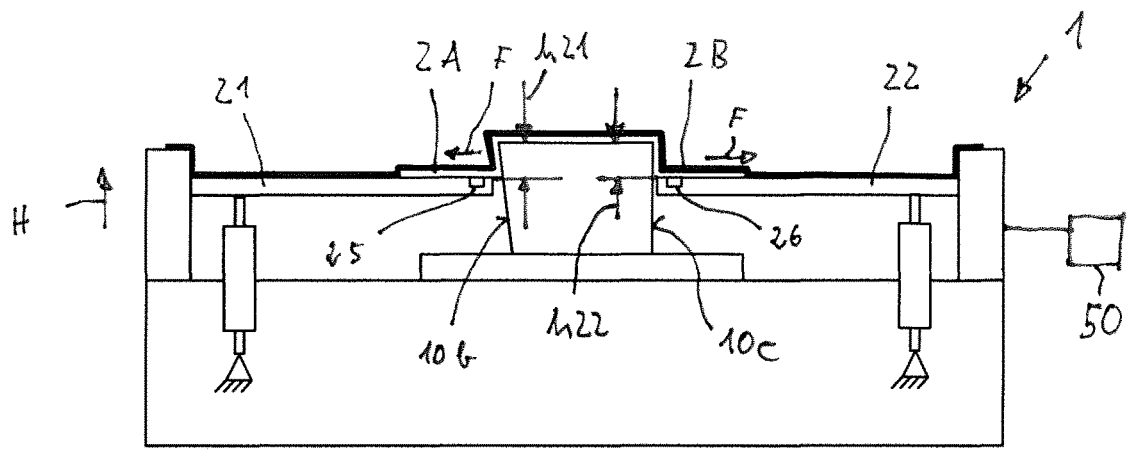
FIG. 7 shows a schematic view of the device while carrying out a further step of a method according to an exemplary embodiment of the present invention.

The support installations 21, 22 and the mould core 10 are subsequently moved relative to one another in the lifting direction H by means of the lifting installation 40. On account thereof, the support faces 21a, 22a in relation to the web face 10a of the mould core 10 are lowered along the lateral faces 10b, 10c of the mould core 10, or a level differential h21, h22 between the web face 10a and the support faces 21a, 22b is set, in particular successively enlarged, respectively. The film 31 by virtue of the prevailing vacuum in the operating space 34 is suctioned onto the mould core 10 and the support installations 21, 22. The peripheral regions 2A, 2B of the fibrous mat 2 on account of the relative movement of the mould core 10 and the support installations 21, 22 are pulled from the support surfaces 21a, 22a and brought to bear on the lateral faces 10b, 10c of the mould core 10, as is shown in FIGS. 7, 8 and 11. By virtue of the relative movement of the mould core 10 and the support installations 21, 22, while simultaneously exerting a compressive force, either by the film 31 or by the compression plates 61, 62, on the peripheral regions 2A, 2B of the fibrous mat 2 the peripheral regions 2A, 2B of the fibrous mat 2 slide on the support surfaces 21a, 22a, wherein a friction force F that is directed away from the lateral faces 10b, 10c of the mould core 10 acts on the peripheral regions. The risk of folds being formed when bringing to bear of the peripheral regions 2A, 2B of the fibrous mat 2 on the lateral faces 10b, 10c of the mould core 10 is thus reduced.

In the case of the peripheral regions 2A, 2B of the fibrous mat 2 being pressed onto the support installations 21, 22 by compression plates 61, 62, the first compression plate 61 is held at a constant spacing d61 from the first support surface 21a, and the second compression plate 62 is held at a constant spacing d62 from the second support surface 22a during the relative movement of the support installations 21, 22 and of the mould core 10.

Forming the fibrous mat 2 to the shape of the fibrous preform 3 is performed by bringing to bear of the peripheral regions 2A, 2B of the fibrous mat 2 on the lateral faces 10b, 10c of the mould core 10. It can optionally be provided that the peripheral regions 2A, 2B of the fibrous mat 2 are in each case completely brought to bear on the lateral faces 10b, 10c of the mould core 10. However, it can also be provided that such a level differential h21, h22 between the support surfaces 21a, 22a and the web face 10a is set that in each case one stripe-shaped portion 2C, 2D of the peripheral regions 2A, 2B of the fibrous mat 2 remains on the respective support face 21a, 22a. These strip-shaped portions 2C, 2D can in each case in particular overlap the optional contact rails 27, 28.

Activating a binding agent contained in the fibrous mat 2 by heating the fibrous mat 2 is subsequently optionally performed. The binding agent is activated by said heating, this leading to curing or melting and solidifying of the binding agent and thus to the setting of the shape or design of the fibrous mat 2.

In order for the fibrous mat 2 to be heated, the contact rails 27, 28 of the support installations 21, 22 and/or the mould core contact rails 17, 18 can in particular be connected in an electrically conducting manner to the terminals of the electric voltage source U, as is schematically indicated in FIG. 8. This leads to an electric current flow through the fibres of the fibrous mat 2 being generated in the region of the stripe-shaped portions 2C, 2D of the peripheral regions 2A, 2B of the fibrous mat 2 that bear on the contact rails 27, 28, and/or in the region of the fibrous mat 2 that bears on the mould core 10. Since the fibres form an electrical resistance, said fibres are heated, this leading to the activation of the binding agent.

An enlargement of the lateral spacing of the support installations 21, 22 from the mould core 10 can optionally be performed before releasing the vacuum, so as to generate a release of the film 31 from the preform. On account thereof, a compression of the flange regions of the preform that bear on the lateral faces 10b, 10c of the mould core 10 can be avoided when demoulding, thus when removing the preform from the mould core 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Device
2 Fibrous mat
2A First peripheral region of the fibrous mat
2B Second peripheral region of the fibrous mat
3 Fibrous preform
5 Depositing surface
6 Transverse web of the fibrous preform
7 First lateral web of the fibrous preform
8 Second lateral web of the fibrous preform
10 Mould core
10a Web face of the mould core
10b First lateral face of the mould core
10c Second lateral face of the mould core
11 Base plate
12, 13 Part-cores
17 First mould core contact rail
18 Second mould core contact rail
21 First support installation
21a First support surface
22 Second support installation
22a Second support surface
23 Peripheral region of the first support installation
23A Lateral periphery of the first support installation
24 Peripheral region of the second support installation
24A Lateral periphery of the second support installation
25 First groove
26 Second groove
27 First contact rail
28 Second contact rail
29 Fastening screw
30 Film installation
31 Film
31A Circumferential peripheral region of the film
32 Frame
33 Intermediate space
34 Operating space
40 Lifting installation
50 Evacuation installation
61 First compression plate
62 Second compression plate
63 First positioning installation
64 Second positioning installation
70 Pedestal
b27 Width of the contact rail
C Transverse direction
d61 Spacing of the first compression plate from the first support surface
d62 Spacing of the second compression plate from the second support surface
F Friction force
H Lifting direction
h21 Level differential between the web face and the first support surface
h22 Level differential between the web face and the second support surface
L Longitudinal direction
q27 Projection
S1 First side
S2 Second side
t25 Groove depth U Voltage source
W Connector line

The invention claimed is:

1. A method for producing a fibrous preform, comprising the following method steps:
   placing a fibrous mat onto a depositing surface formed by a web face of a mold core, a first support surface of a first support installation and a second support surface of a second support installation, wherein the first support surface and the second support surface laterally adjoin the web face of the mold core;
   covering the fibrous mat with an elastically deformable, gas-tight film;
   pressing the fibrous mat in a planar manner onto the depositing surface by generating a vacuum between the film and the depositing surface; and
   bringing to bear of the fibrous mat on lateral faces of the mold core that extend transversely to the web face by moving the support installations and the mold core relative to one another in such a manner that a level differential between the web face of the mold core and the support surfaces of the support installations is enlarged.

2. The method according to claim 1, wherein the first support surface of the first support installation and the second support surface of the second support installation when depositing the fibrous mat continually extend the web face of the mold core.

3. The method according to claim 1, wherein the bringing to bear of the fibrous mat on the lateral faces of the mold core comprises a lowering of the first support installation and of the second support installation in relation to the web face of the mold core and/or a lifting of the mold core in relation to the first support surface and the second support surface.

4. The method according to claim 1, further comprising the following method step:
   heating the fibrous mat and on account thereof activating a binding agent contained in the fibrous mat, or varying the viscosity of a matrix material of the fibrous mat for fixing the fibers of the fibrous mat in that position that said fibers have attained by the bringing to bear of the fibrous mat on the lateral faces of the mold core.

5. The method according to claim 4, wherein the heating is performed by generating an electric current flow through electrically conducting fibers of the fibrous mat.

6. The method according to claim 5, wherein the electric current flow is generated in that a first contact rail disposed on the first support surface and a second contact rail disposed on the second support surface are connected to an electric voltage source.

7. The method according to claim 5, wherein the electric current flow is generated in that at least two mold core contact rails disposed on the web face and/or the lateral faces of the mold core are connected to an electric voltage source.

8. The method according to claim 1, further comprising the following method step:
   pressing a first compression plate onto a first peripheral region of the fibrous mat deposited on the depositing surface, wherein the first peripheral region of the fibrous mat is deposited on the first support surface, and pressing a second compression plate onto a second peripheral region of the fibrous mat deposited on the depositing surface, wherein the second peripheral region of the fibrous mat is deposited on the second support surface, wherein the first compression plate is maintained at a constant spacing from the first support surface, and the second compression plate is maintained at a constant spacing from the second support surface.

9. A device for producing a fibrous preform, comprising:
   a mold core having a web face, a first lateral face that extends transversely to the web face and along a lifting direction, and a second lateral face that extends transversely to the web face and along the lifting direction;
   a first support installation having a first support surface, wherein the first support installation is disposed on a first side of the mold core defined by the first lateral face of the mold core;
   a second support installation having a second support surface, wherein the second support installation is disposed on a second side of the mold core defined by the second lateral face of the mold core;
   a film installation having an elastically deformable, gas-tight film for producing an evacuation-capable intermediate space between the mold core, the support installations and the film;
   a lifting installation by which the mold core and the support installations are movable relative to one another in the lifting direction; and
   an evacuation installation for evacuating the intermediate space.

10. The device according to claim 9, wherein the first support installation has a first contact rail projecting beyond the first support surface, and the second support installation has a second contact rail projecting beyond the second support surface, wherein the first contact rail and the second contact rail are configured to be connected to an electric voltage source, wherein the first contact rail is disposed in a first groove configured in the first support surface, and the second contact rail is disposed in a second groove configured in the second support surface.

11. The device according to claim 10, wherein the first contact rail extends along a peripheral region of the first support installation facing the first lateral face of the mold core, and the second contact rail extends along a peripheral region of the second support installation facing the second lateral face of the mold core.

12. The device according to claim 9, wherein the mold core has a first mold core contact rail and a second mold core contact rail, wherein the mold core contact rails project in each case beyond the web face and/or the lateral faces of the mold core.

13. The device according to claim 9, wherein the device further comprises a first compression plate and a second compression plate, wherein the first compression plate by means of a first positioning installation is configured to be positioned at a predetermined spacing relative to the first support surface, and wherein the second compression plate by means of a second positioning installation is configured to be positioned at a predetermined spacing relative to the second support surface.

14. The device according to claim 9, wherein the device further comprises a pedestal on which the mold core and the support installations are disposed.

15. The device according to claim 14, wherein the film installation has a frame to which the film is fastened in a gas-tight manner, wherein the frame of the film installation is configured to be fastened in a gas-tight manner to the pedestal.

* * * * *